(12) United States Patent
Ikeda (10) Patent No.: US 7,898,930 B2
(45) Date of Patent: Mar. 1, 2011

(54) OPTICAL DISK DRIVE

(75) Inventor: Jinya Ikeda, Kasama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 442 days.

(21) Appl. No.: 12/080,180

(22) Filed: Mar. 31, 2008

(65) Prior Publication Data

US 2009/0073840 A1 Mar. 19, 2009

(30) Foreign Application Priority Data

Sep. 13, 2007 (JP) ................... 2007-238043

(51) Int. Cl.
*G11B 20/10* (2006.01)
(52) U.S. Cl. ............... 369/124.15; 369/59.17; 369/47.15
(58) Field of Classification Search ............. 369/124.01, 369/124.05, 124.07, 124.08, 124.11, 124.12, 369/44.34, 44.26, 47.27, 124.15, 59.17, 59.23, 369/47.15, 47.22
See application file for complete search history.

(56) References Cited

U.S. PATENT DOCUMENTS

| | | | | | |
|---|---|---|---|---|---|
| 5,841,751 | A | * | 11/1998 | Komazaki et al. | 369/53.33 |
| 5,923,219 | A | * | 7/1999 | Ide et al. | 330/308 |
| 6,366,549 | B1 | * | 4/2002 | Lee et al. | 369/44.34 |
| 6,762,982 | B2 | * | 7/2004 | Armitage | 369/47.25 |
| 7,079,475 | B2 | * | 7/2006 | Hagiwara | 369/124.07 |
| 2001/0028613 | A1 | * | 10/2001 | Okamoto et al. | 369/44.25 |
| 2003/0152000 | A1 | * | 8/2003 | Yamanoi et al. | 369/53.22 |
| 2004/0008592 | A1 | * | 1/2004 | Park et al. | 369/53.31 |

FOREIGN PATENT DOCUMENTS

| | | | |
|---|---|---|---|
| JP | 2000030260 A | * | 1/2000 |
| JP | 2002170242 A | * | 6/2002 |
| JP | 2004-134002 | | 4/2004 |
| JP | 2005-166211 | | 6/2005 |

* cited by examiner

*Primary Examiner* — Thang V Tran (74) *Attorney, Agent, or Firm* — Kilpatrick Townsend & Stockton LLP (57) ABSTRACT

In an embodiment, an optical disk drive includes a land prepit detection circuit. With such circuit, if the optical disk drive reads a poor-quality disk on which, in terms of signals, LPP-like noises are caused by a defect of a land area, it is possible to increase the noise immunity and LPP detection accuracy of the optical disk drive so that the optical disk drive is capable of successfully detecting LPP without fail.

6 Claims, 8 Drawing Sheets

OPTICAL DISK DRIVE

CLAIMS OF PRIORITY

The present application claims priority from Japanese application serial no. JP2007-238043, filed on Sep. 13, 2007, the content of which is hereby incorporated by reference into this application.

TECHNICAL FIELD

The present invention relates to optical disk drives, and more particularly to optical disk drives, each of which uses a DVD-R/DVD-RW format optical disk whose land area is provided with a land prepit used to write address information, each of which has high immunity to large noises that are caused by a defect of the land area and that cannot be distinguished from the land prepit as a signal, and each of which has high accuracy in detection of the land prepit.

BACKGROUND OF THE INVENTION

DVD disks are achieving widespread use as recording media for storing multimedia data including a moving image, and audio data. Various kinds of formats for the DVD disks have been proposed thus far.

In particular, in a commonly-used physical format of writing type DVD disks, the disk surface is sectioned into groove areas (referred to as "groove") and land areas (referred to as "land"), each of which is located between grooves. Addressing is performed by meandering (wobble) of the grooves.

In the case of DVD-R/DVD-RW that is a kind of format of writing type DVD disks, in addition to the wobble, each land area is provided with pits used for addressing (each pit is called a land prepit (LPP)) by which address information on the optical disk is recorded.

JP-A-2004-134002 discloses the technology for detecting LPP by a push-pull signal obtained by a photodetector. The LPP detection method disclosed in JP-A-2004-134002 includes the steps of: holding as a peak S1 an amplitude fluctuation component that is caused by noises and meandering grooves; adding an offset component S2 to the peak S1 to generate comparison reference voltage Vth; and detecting LPP by comparing a push-pull signal with the comparison reference voltage Vth. JP-A-2004-134002 states that the above-described method makes it possible to stably detect LPP without being influenced by amplitude fluctuations caused by noises and recording marks.

In addition, JP-A-2005-166211 discloses a LPP detection technology including the steps of: dividing the difference between a peak value of a prepit detection circuit and a peak value of a wobble signal component; and using the divided voltage level as a slice level to detect LPP by a comparator.

Problems with the LPP detection circuit according to the prior art will be described with reference to FIG. 7 and FIGS. 8A and 8B as below.

Figure 7:
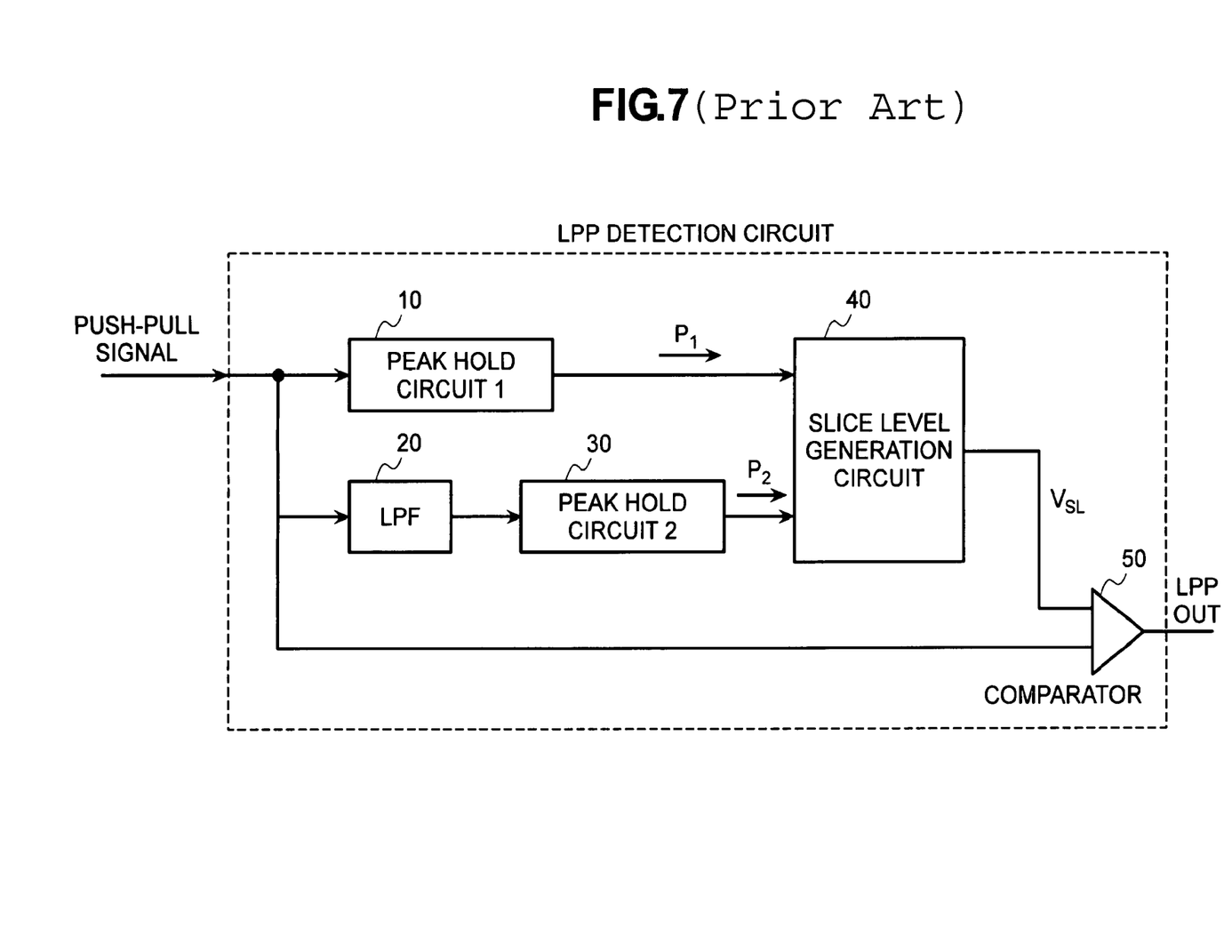
FIG. 7 is a circuit diagram illustrating a LPP detection circuit according to the prior art.

FIG. 7 is a circuit diagram illustrating the LPP detection circuit according to the prior art.

Figure 8A:
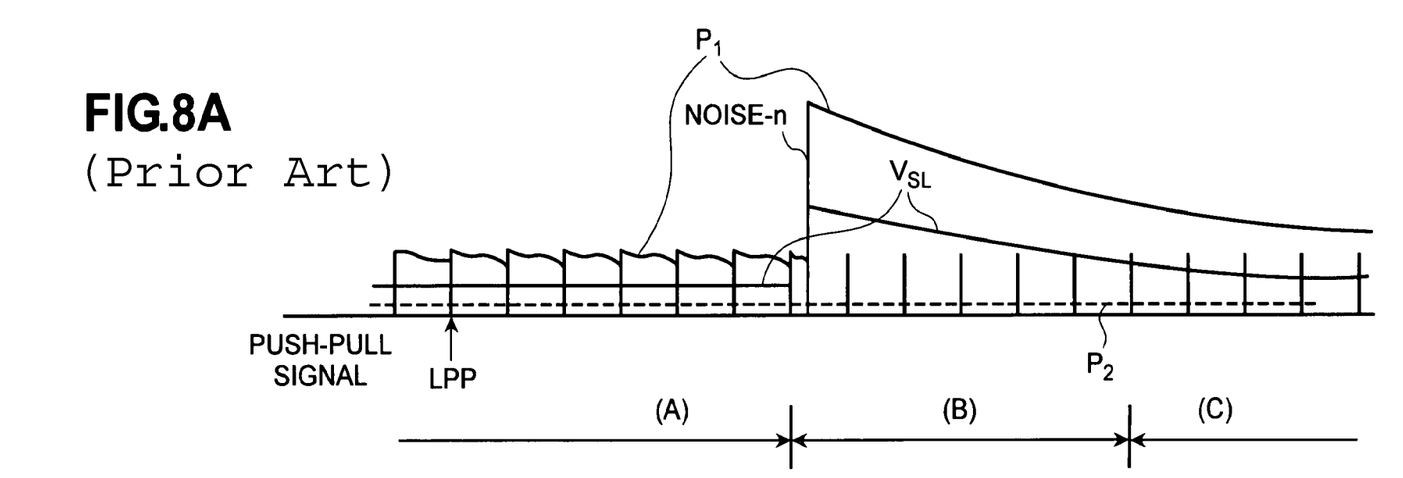
FIGS. 8A and 8B are waveform charts each illustrating LPP detection according to the prior art.
Figure 8B:
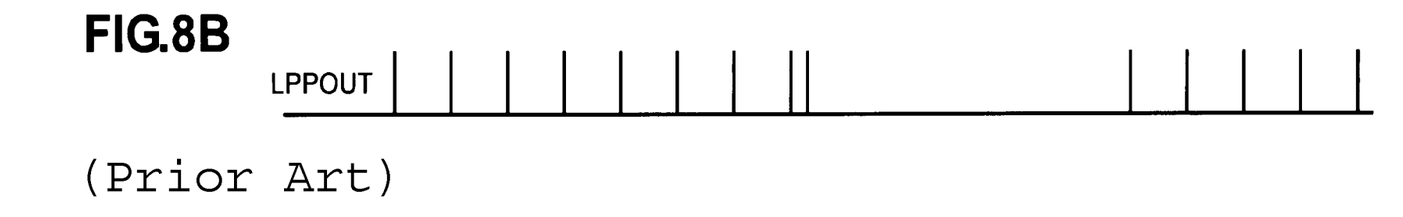

FIGS. 8A and 8B are waveform charts each illustrating LPP detection according to the prior art.

A circuit shown in FIG. 7 is based on the same idea as that of JP-A-2005-166211. To be more specific, a voltage value indicated by two peak hold circuits is divided to determine a slice level (threshold value) used for the LPP detection.

A LPP detection circuit 0 is a circuit for inputting a push-pull signal and for outputting a signal used to detect LPP, the push-pull signal being generated by amplifying the output of a photodetector (not illustrated).

As shown in FIG. 7, the LPP detection circuit 0 of the optical disk drive according to the prior art to be described hereinbelow includes a peak hold circuit 1:10, a LPF (Low Pass Filter) 20, a peak hold circuit 2:30, a slice level generation circuit 40, and a comparator 50.

A push-pull signal that has been input into the LPP detection circuit 0 is input into the peak hold circuit 1:10, the LPF 20, and the peak hold circuit 2:30.

The peak hold circuit 1:10 outputs a peak voltage P1 of the inputted voltage. On the other hand, the LPF 20 attenuates the inputted signal. The attenuated signal is then input into the peak hold circuit 2:30. After that, a peak voltage P2 is output from the peak hold circuit 2:30. Next, the peak voltage P1 output from the peak hold circuit 1:10 and the peak voltage P2 output from the peak hold circuit 2:30 are input into the slice level generation circuit 40. Then, the voltage difference between the peak voltage P1 and the peak voltage P2 is divided by a constant ratio to generate a slice level $V_{s1}$.

To be more specific, the slice level $V_{s1}$ is expressed by equation 1 as follows:

$$V_{s1} = r(P1 - P2) \quad \text{(Equation 1)}$$

where r is a proper division ratio used to detect LPP. For example, r is 1/2=50%.

Next, the comparator 50 compares the slice level $V_{s1}$, which has been generated by the slice level generation circuit 40, with the push-pull signal. If the push-pull signal is larger than $V_{s1}$, it is to be judged that LPP have been detected.

During a period (A) shown in FIG. 8A, the push-pull signal output at a position of LPP is intermittently shown. In response to a push-pull signal which has become larger than the slice level $V_{s1}$, LPP is detected as shown in FIG. 8B.

However, if an extremely high spike-shaped peak voltage P1 occurs due to a noise n generated by a land area defect, $V_{s1}$ increases. Accordingly, as indicated by (B) in FIG. 8A, there occurs a case where until the slice level $V_{s1}$ decreases to a level (C) shown in FIG. 8A, LPP is not detected although the LPP exists.

SUMMARY OF THE INVENTION

Thus, the problem involved when noises are detected from a poor-quality disk is that LPP is not detected for a certain period of time after the noises have occurred.

The cause of the above-described problem is as follows: a noise level increases the peak voltage P1 of the output from the peak hold circuit 1:10; as a result, the slice level $V_{s1}$ also extremely increases immediately after that. Because the increase in voltage of the peak hold circuit 1:10 changes in a short period of time whereas the decrease in voltage changes in a long period of time, the peak voltage P1 slowly decreases after the occurrence of the noises. Therefore, it is not possible to detect LPP until the slice level $V_{s1}$ decreases to the level (C) shown in FIG. 8A.

The present invention has been devised to solve the above-described problems. An object of the present invention is to provide an optical disk drive for writing/reading data to/from an optical disk that is provided with LPP, the optical disk drive having high noise immunity and high LPP detection accuracy so that even if the optical disk drive uses a poor-quality disk on which noises often occur, it is capable of successfully detecting LPP without fail.

According to the present invention, there is provided an optical disk drive that uses as a recording medium an optical disk having a physical format of DVD-R/DVD-RW and that reads address information on the optical disk by use of a land prepit located in a land area of the optical disk. The optical disk drive includes a land prepit detection circuit for inputting a push-pull signal to detect a land prepit. The land prepit detection circuit is configured as follows.

A push-pull signal is input into a first peak hold circuit and is also input into a second peak hold circuit through an LPF.

Next, a bottom hold circuit is provided that inputs a first peak voltage output from the first peak hold circuit so as to generate a bottom voltage. The bottom voltage output from the bottom hold circuit is lower than the first peak voltage; at the same time, even if a push-pull signal becomes large because of noises caused by a defect of a land area, the bottom voltage does not rapidly change.

Then, a slice level generation circuit divides the difference between the bottom voltage output from the bottom hold circuit and a second peak voltage output from the second peak hold circuit to generate a slice level used to detect a land prepit. After that, a comparator compares a push-pull signal input thereto with the slice level generated by the slice level generation circuit to detect a land prepit.

In addition, in the case of a push-pull signal whose voltage is applied in the reverse direction, the "peak circuit" is replaced with the "bottom circuit" and vice versa in the above-described configuration.

In other words, the push-pull signal is input into a first bottom hold circuit and is also input into a second bottom hold circuit through the LPF.

Next, a peak hold circuit is provided that inputs a first bottom voltage output from the first bottom hold circuit so as to generate a peak voltage.

The slice level generation circuit divides the difference between the peak voltage output from the peak hold circuit and the second bottom voltage output from the second bottom hold circuit to generate a slice level used to detect a land prepit. Then, the comparator compares a push-pull signal input thereto with the slice level generated by the slice level generation circuit to detect a land prepit.

DESCRIPTION OF THE INVENTION

Each embodiment of the present invention will be described with reference to FIG. 1 to FIG. 6 as below.

First Embodiment

A first embodiment of the present invention will be described with reference to FIG. 1 to FIGS. 4A and 4B as below.

First of all, the structure of an optical disk drive according to the first embodiment of the present invention will be described.

Figure 1:
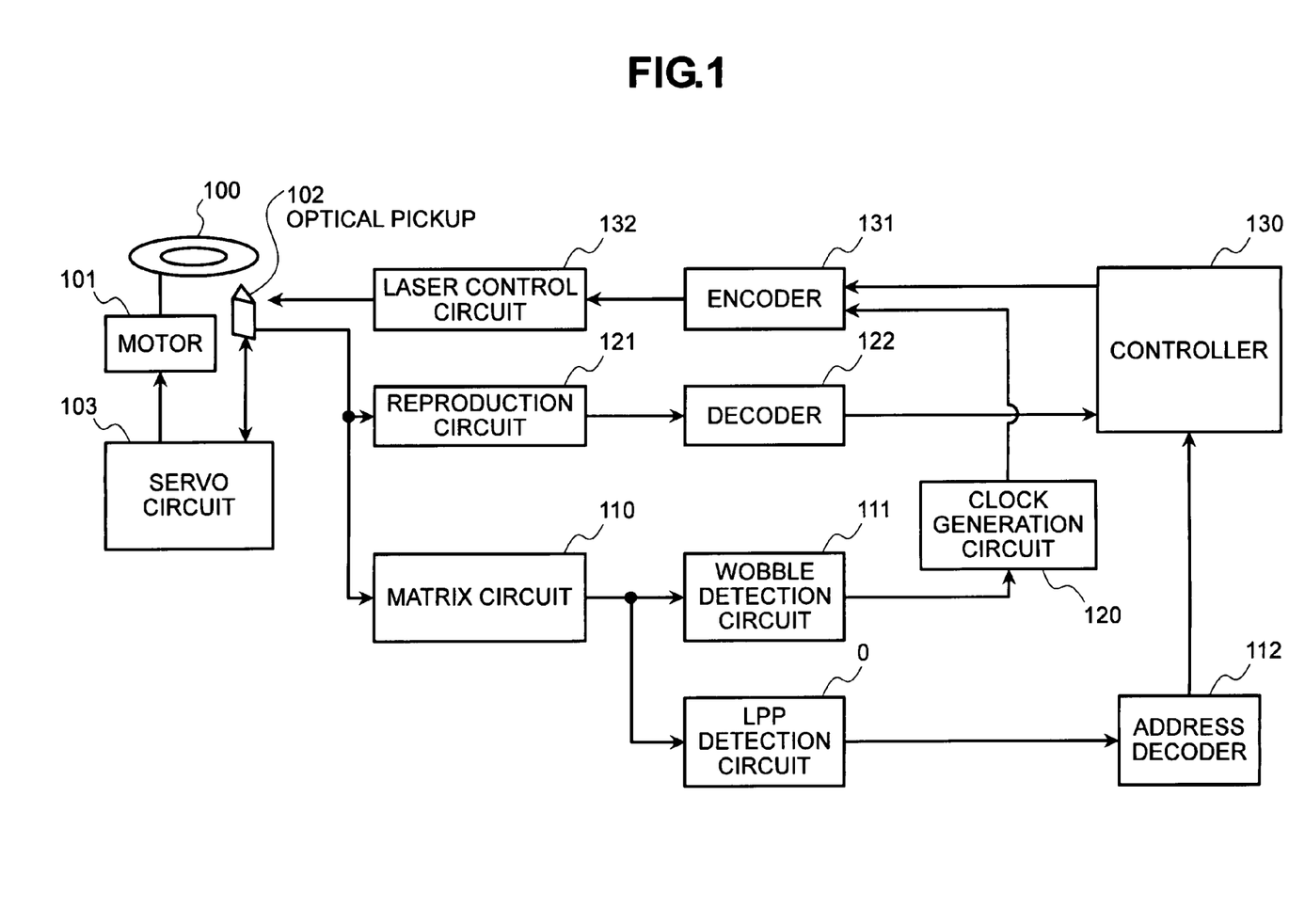
FIG. 1 is a diagram illustrating the structure of an optical disk drive according to a first embodiment of the present invention.

FIG. 1 is a diagram illustrating the structure of the optical disk drive according to the first embodiment of the present invention.

As shown in FIG. 1, the optical disk drive according to the first embodiment of the present invention is a disk drive for writing/reading data to/from an optical disk 100. The optical disk drive handles an optical disk whose land area is provided with a land prepit used to record address information and whose physical format is a so-called wobble groove DVD-R/DVD-RW format.

As shown in FIG. 1, the optical disk drive according to the first embodiment of the present invention includes the optical disk 100, a motor 101, an optical pickup 102, a servo circuit 103, a matrix circuit 110, a wobble detection circuit 111, a LPP detection circuit 0, an address decoder 112, a reproduction circuit 121, a decoder 122, a clock generation circuit 120, a controller 130, an encoder 131, and a laser control circuit 132.

The controller 130 includes a central processing unit (CPU) and memories such as a ROM and a RAM. The controller 130 controls each part of the optical disk drive and issues a required instruction to each part.

The optical pickup 102 includes a laser light source such as a semiconductor laser. The optical pickup 102 condenses a laser beam emitted from the laser light source and then irradiates the optical disk 100 with a spotlight beam. This optical pickup 102 includes: an optical system for separating a reflected light beam coming from the optical disk, the optical system being constituted of a collimator lens, a condensing lens, a beam splitter, and the like; and a photodetector that is light receiving means for receiving the reflected light beam to convert it into an electric signal (read signal).

When writing information, this optical disk drive transmits the information to be written from outside host device (not illustrated) to the encoder 131 through the controller 130. The encoder 131 converts a data format. Then, in response to information bits, the laser control circuit 132 performs light-emission control of the laser light source that is mounted on the pickup 102. As a result, the write operation to the optical disk 100 is performed by use of a spotlight beam for recording.

On the other hand, when information written on the optical disk 100 is read, the optical pickup 102 irradiates the optical disk 100 with a spotlight beam that is a laser beam used for reading. Then, the photodetector detects a reflected light beam of the spotlight beam. The reproduction circuit 121 then performs the filtering and digitization of the detected read signal. After that, the decoder 122 converts the format of the data generated by the reproduction circuit 121, and then the controller 130 transmits the read information to the outside host device.

The light receiving area of the photodetector which is mounted on the optical pickup 102 is divided into two in the track width direction of the optical disk 100. From two signals that have been detected by the two light receiving areas of the photodetector respectively, the reproduction circuit 121 generates a servo signal. According to the generated servo signal, the servo circuit 103 drives and controls a tracking motor so that the tracking position of the optical pickup 102 is controlled. In addition, on the basis of a clock signal output from the clock generation circuit 120, the servo circuit 103 also performs the rotation control of the motor 15 for rotating the optical disk 100.

Moreover, the two signals, which have been detected by the two light receiving areas of the photodetector respectively, are converted into a required push-pull signal by the matrix circuit 110. The push-pull signal is then transmitted to the wobble detection circuit 111 and the LPP detection circuit 0. Here, on the basis of a wobble clock detected by the wobble detection circuit 111, the clock generation circuit 120 generates a correct clock signal that is synchronized with the rotation of the optical disk 100.

On the other hand, the LPP detection circuit 0 detects from the push-pull signal a LPP signal including physical address information, and then the address decoder 112 converts the LPP signal into address information so as to obtain address information of an access position at which the optical pickup 102 accesses the optical disk 100 at this point of time.

Next, the physical format of the optical disk will be described with reference to FIG. 2.

Figure 2:
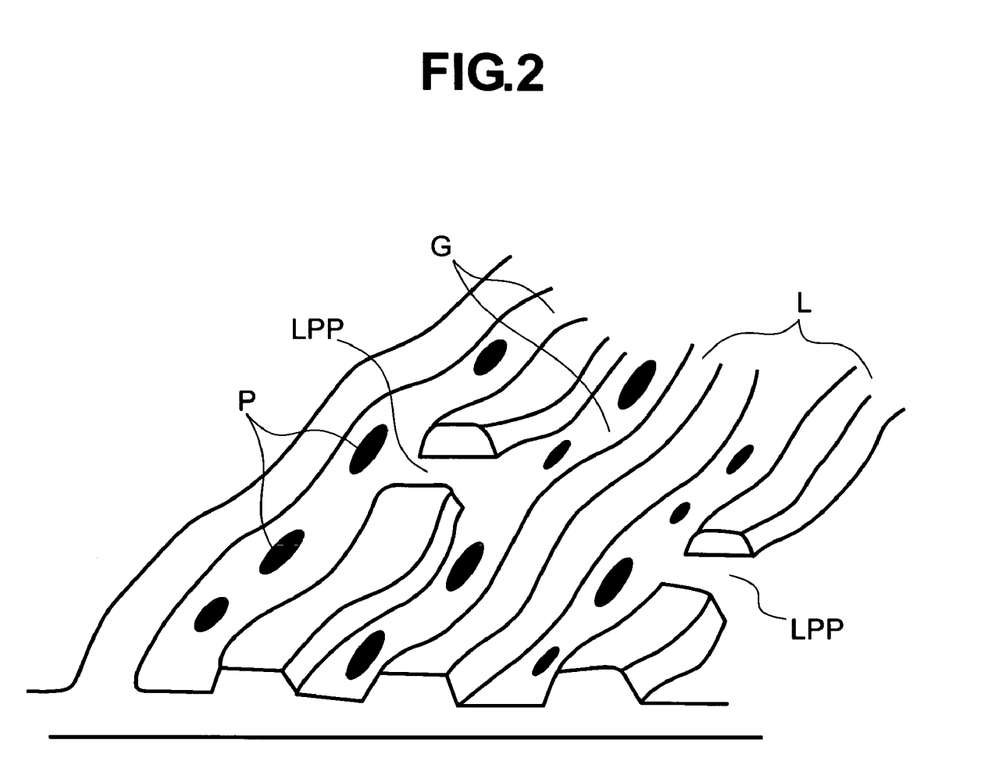
FIG. 2 is a bird's-eye view illustrating the structure of the surface of an optical disk.

FIG. 2 is a bird's-eye view illustrating the structure of the surface of the optical disk.

The surface of the DVD-R/DVD-RW is structured as shown in FIG. 2. To be more specific, the surface is alternately provided with groove areas, each of which is called a groove G, and trapezoidal land areas, each of which is called a land L. Each of the grooves G meanders (wobbles). Data is recorded by recording pits P provided in the groove G.

Each of the lands L has portions disconnected by a land prepit LPP that each indicates address information. Addressing of data is performed on the basis of the address information.

The present invention relates to a circuit for detecting such land prepits LPP.

Next, LPP detection processing according to the first embodiment of the present invention will be described with reference to FIG. 3 and FIGS. 4A and 4B.

Figure 3:
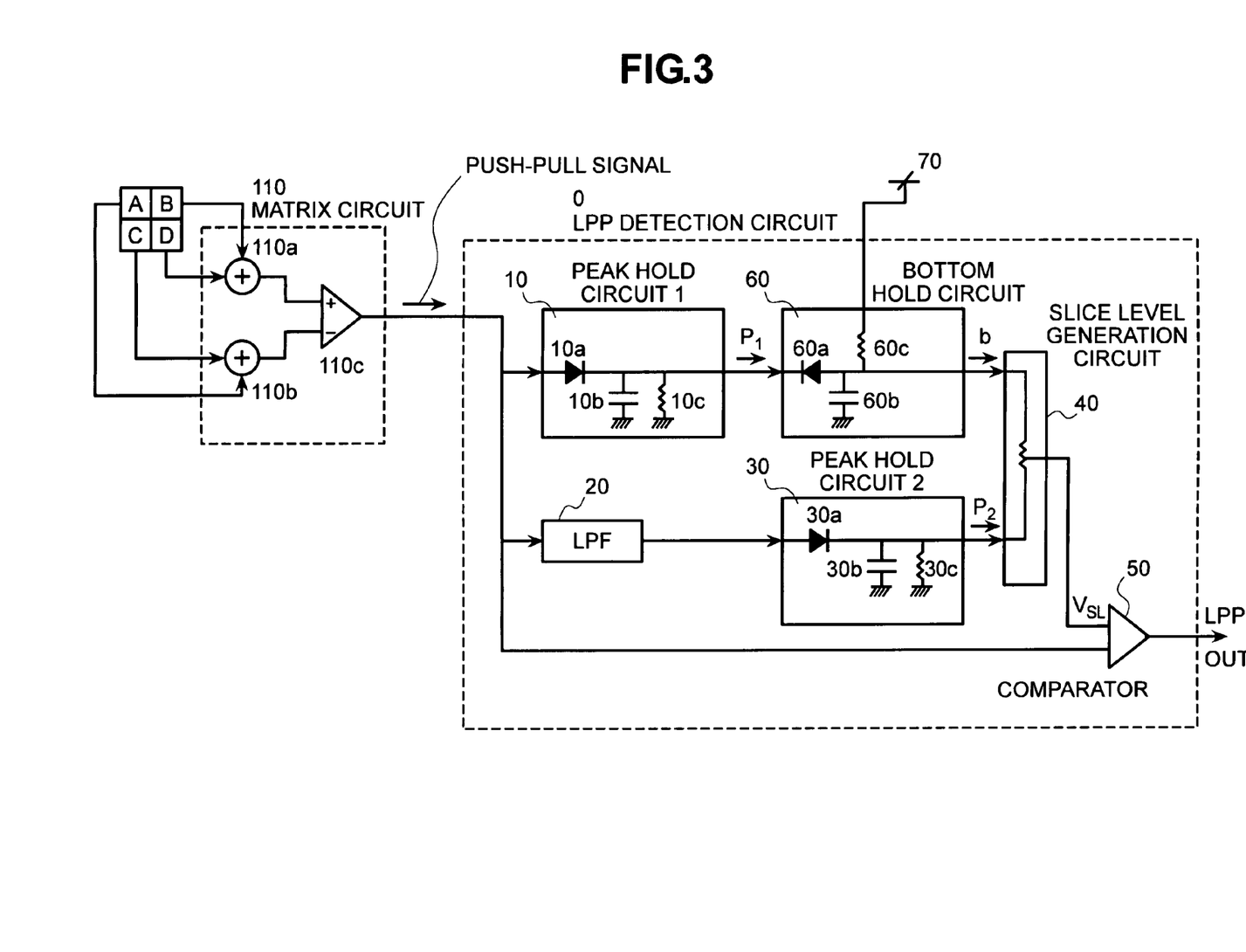
FIG. 3 is a circuit diagram illustrating circuits for performing LPP detection processing according to the first embodiment of the present invention.

FIG. 3 is a circuit diagram illustrating circuits for performing the LPP detection processing according to the first embodiment of the present invention.

Figure 4A:
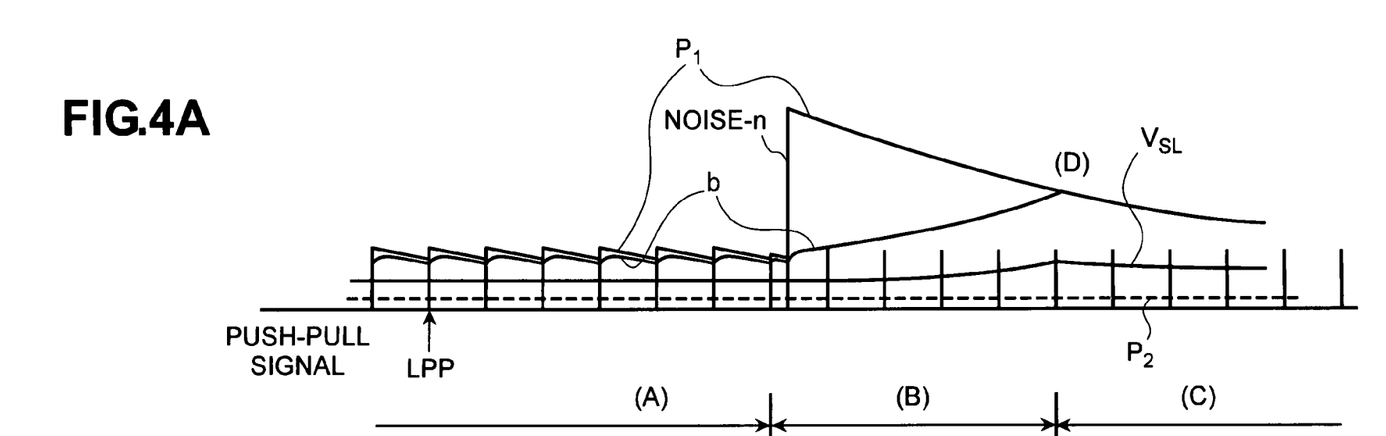
FIGS. 4A and 4B are waveform charts each illustrating LPP detection according to the first embodiment of the present invention.
Figure 4B:
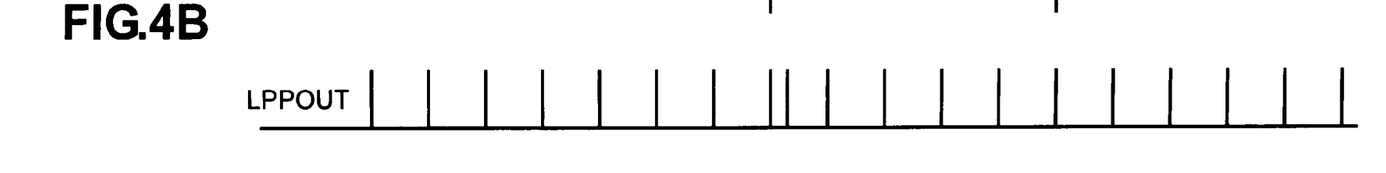

FIGS. 4A and 4B are waveform charts each illustrating LPP detection according to the first embodiment of the present invention.

As the circuits for performing the LPP detection processing, FIG. 3 illustrates the photodetector, part of the matrix circuit 110, and the LPP detection circuit 0.

The photodetector includes four-divided light receiving elements A, B, C, and D. An adder 110b generates an output signal A+C whereas an adder 110a generates an output signal B+D. Then, both of the output signals are input into a differential amplifier 110c which amplifies the difference between the two inputs, (B+D)−(A+C). After that, the amplified difference is output from the matrix circuit 110 as a push-pull signal. Incidentally, the matrix circuit 110 shown in FIG. 3 includes only elements required to generate the push-pull signal.

As shown in FIG. 3, the LPP detection circuit 0 includes a peak hold circuit 1:10, LPF (Low Pass Filter) 20, a peak hold circuit 2:30, a slice level generation circuit 40, a comparator 50, and a bottom hold circuit 60.

The bottom hold circuit 60 is added to the circuit shown in FIG. 7 that illustrates the prior art.

The push-pull signal, which has been output from the matrix circuit 110, is input into the peak hold circuit 1:10, the LPF 20, and the comparator 50.

The peak hold circuit 1:10 outputs a peak voltage P1 of the input voltage. As shown in the figure, the peak hold circuit 1:10 includes a diode 10a, a capacitor 10b, and a resistor 10c. The voltage which has been input into the peak hold circuit 1:10 is charged into the capacitor 10b as an electric charge. Subsequently, electrical discharge through the resistor 10c gradually occurs. Therefore, the rising edge of the voltage P1 output from the peak hold circuit 1:10 is steep; in contrast, when the voltage drops, the falling edge thereof is gentle.

The voltage P1 output from the peak hold circuit 1:10 is input into the bottom hold circuit 60. As shown in the figure, the bottom hold circuit 60 includes a diode 60a, a capacitor 60b, and a resistor 60c. The bottom hold circuit 60 is connected to a direct-current power supply unit 70 that is located outside.

Because the reverse bias diode 60a is connected to the bottom hold circuit 60, the voltage input into the bottom hold circuit 60 increases gently. In addition, because the direct-current power supply unit 70 is connected to the resistor 60c, electricity is always being charged into the capacitor 60b.

Therefore, the rising edge of a bottom voltage b which is output from the bottom hold circuit 60 is gentle. Subsequently, when the voltage drops, it changes in a relatively short period of time.

On the other hand, the LPF 20 attenuates the input signal. The attenuated signal is then input into the peak hold circuit 2:30. After that, a peak voltage P2 is output from the peak hold circuit 2:30.

As is the case with the peak hold circuit 1:10, the peak hold circuit 2:30 includes a diode 30a, a capacitor 30b, and a resistor 30c. Characteristics of the peak hold circuit 2:30 are the same as those of the peak hold circuit 1:10. Moreover, characteristics of the voltage P2, which is output from the peak hold circuit 2:30, are also the same as those of the voltage P1 output from the peak hold circuit 1:10. However, because the voltage is input into the peak hold circuit 2:30 through the LPF 20, the voltage P2 output from the peak hold circuit 2:30 becomes much lower.

Then, the bottom voltage b output from the bottom hold circuit 60 and the peak voltage P2 output from the peak hold circuit 2:30 are input into the slice level generation circuit 40. Then, the slice level generation circuit 40 divides the voltage difference between the bottom voltage b and peak voltage P2 by a constant ratio to output a voltage, which is a slice level $V_{s1}$.

To be more specific, the slice level $V_{s1}$ is expressed by equation 2 as follows:

$$V_{s1} = r(b - P2) \quad \text{(Equation 2)}$$

This equation 2 is formed by replacing P1 of the equation 1 with b.

Incidentally, r is a proper division ratio used to detect LPP. For example, r is 1/2=50%.

Next, the comparator 50 compares the slice level $V_{s1}$, which has been generated by the slice level generation circuit 40, with the push-pull signal. If the push-pull signal is larger than $V_{s1}$, it is to be judged that LPP has been detected. The above-described principles are the same as those used in the prior art.

During a period (A) shown in FIG. 4A, the push-pull signal, which is output at a position of LPP, is intermittently shown. In response to a push-pull signal which has becomes larger than the slice level $V_{s1}$, LPP is detected as shown in FIG. 4B. This operation is the same as that of (A) shown in FIG. 8A illustrating the prior art.

If a noise n is caused by a defect of a land area, a problem arises. In this case, an extremely high spike-shaped peak voltage P1 occurs. However, in this embodiment, the peak voltage P1 is input into the bottom hold circuit 60 so that it is converted into the bottom voltage b. Then, the slice level $V_{s1}$ is generated on the basis of the equation 2.

In this embodiment, as shown in FIG. 4A, even if the occurrence of the noise n causes the peak voltage P1 to become higher, the bottom voltage b does not rapidly become higher. Rather it gradually increases. Accordingly, the slice level $V_{s1}$ does not become so large. Therefore, even during the period (B) shown in FIG. 4A, it is possible to detect LPP as shown in FIG. 4B. After a lapse of a certain period of time, the peak voltage P1 and the bottom voltage b overlap each other at a point (D) shown in FIG. 4A. After that, the voltage slowly decreases. In this embodiment, because the bottom hold circuit 60 is provided to generate the slice level $V_{s1}$ from the bottom voltage b, fluctuations in slice level $V_{s1}$ become small. Therefore, as shown in FIG. 4B, it is possible to detect LPP in all of the periods (A), (B), and (C) shown in FIG. 4A. More specifically, the period (A) is a period before the occurrence of the noise n; the period (B) is a period after the occurrence of the noise n; and the period (C) is a period during which the slice level $V_{s1}$ shifts to a steady state.

Second Embodiment

Next, LPP detection processing according to a second embodiment of the present invention will be described with reference to FIG. 5 and FIGS. 6A and 6B.

The LPP detection processing according to this embodiment is based on the same principles as those of the first embodiment. Although the structure of an optical disk drive in this embodiment is the same as that of the optical disk drive shown in FIG. 1, a case where the voltage of the push-pull signal in the first embodiment is reversed will be described as an example.

Briefly speaking, the LPP detection processing in this embodiment is achieved by replacing the "bottom circuit" of the first embodiment with the "peak circuit," replacing the "peak circuit" thereof with the "bottom circuit," replacing the "bottom voltage" thereof with the "peak voltage," and replacing the "peak voltage" thereof with the "bottom voltage."

Figure 5:
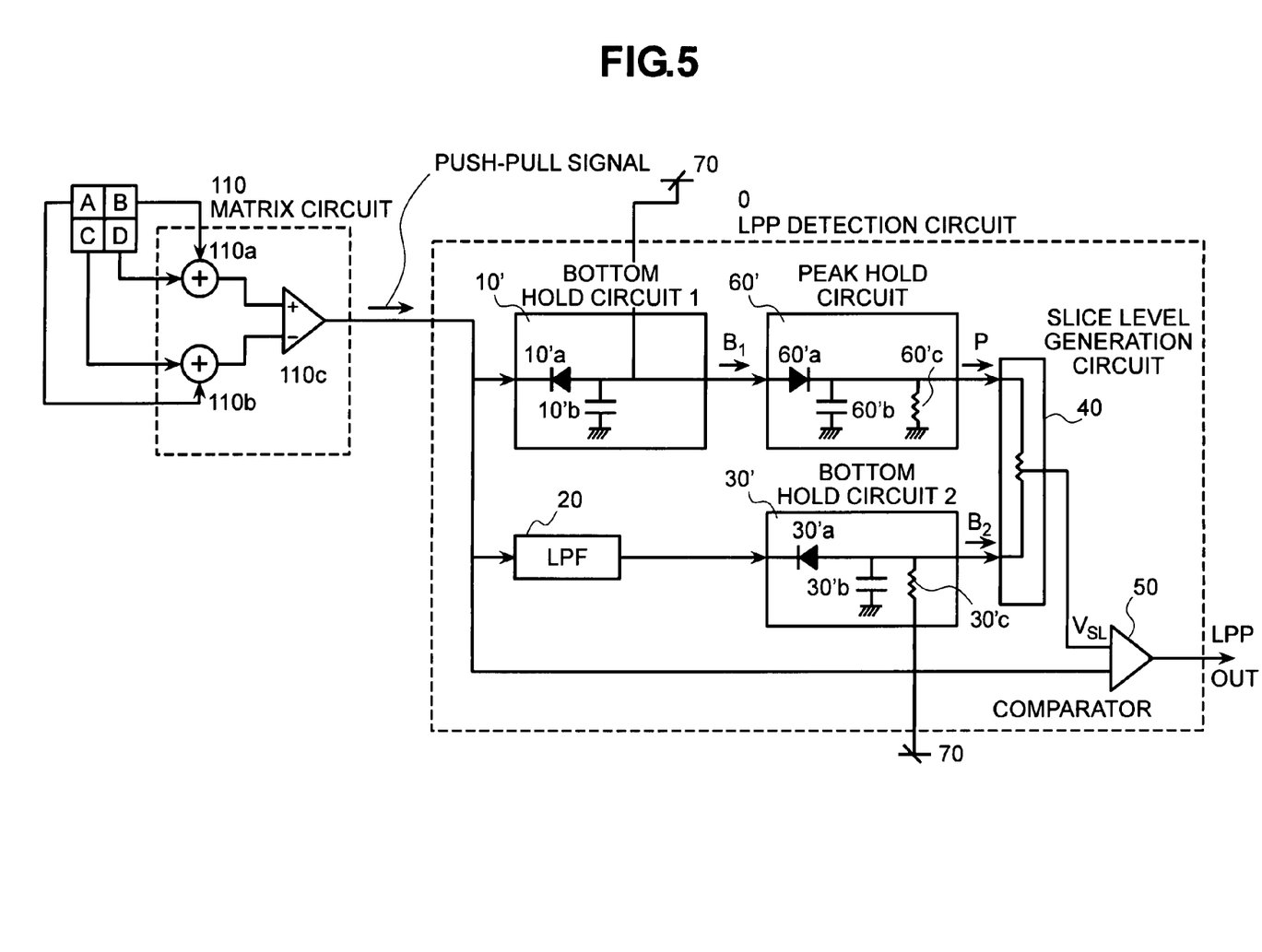
FIG. 5 is a circuit diagram illustrating circuits for performing LPP detection processing according to a second embodiment of the present invention.

FIG. 5 is a circuit diagram illustrating circuits for performing the LPP detection processing according to the second embodiment of the present invention.

Figure 6A:
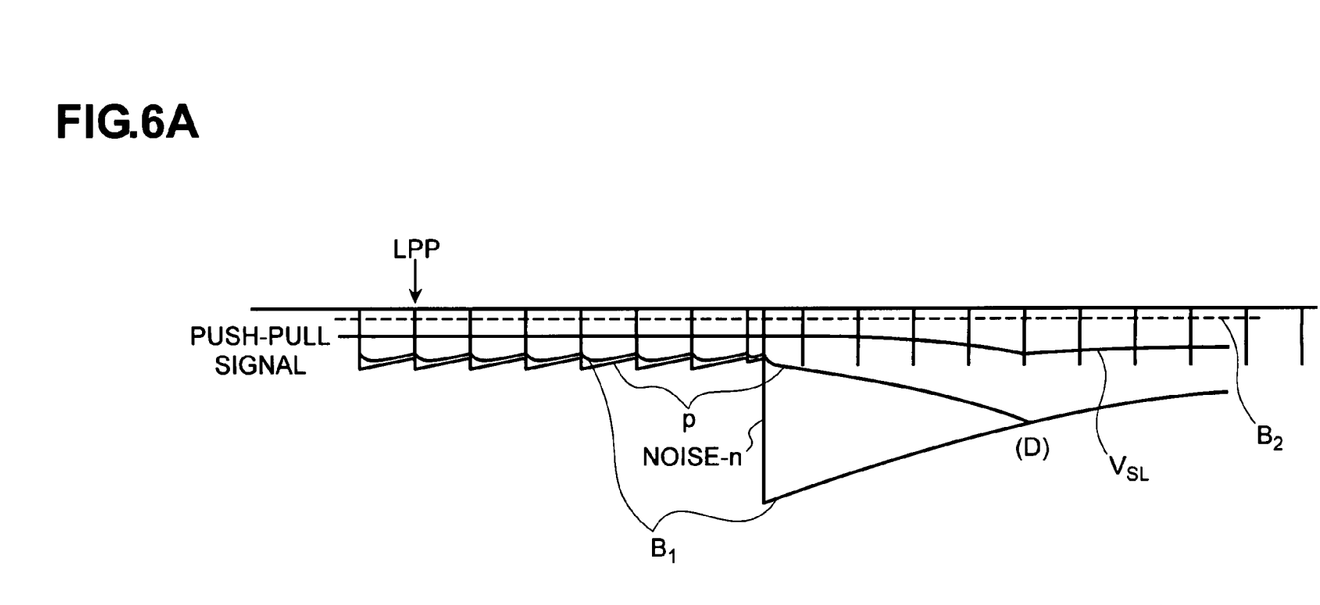
FIGS. 6A and 6B are waveform charts each illustrating LPP detection according to the second embodiment of the present invention.
Figure 6B:
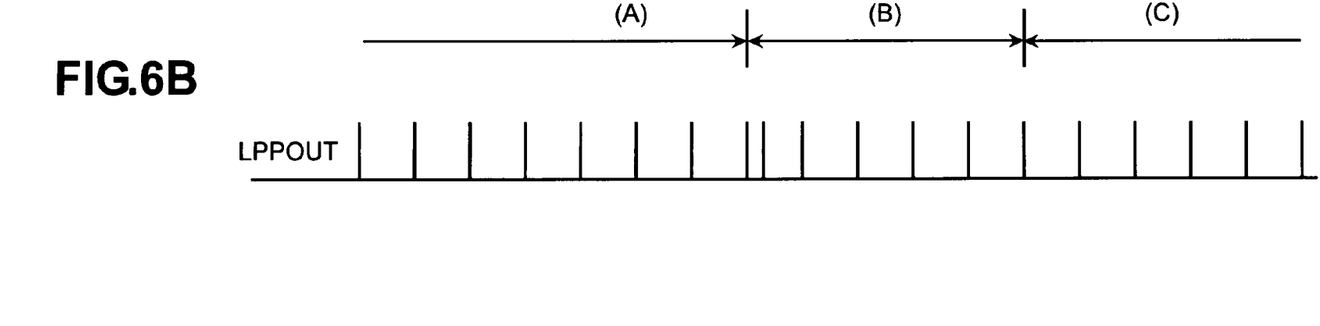

FIGS. 6A and 6B are waveform charts each illustrating LPP detection according to the second embodiment of the present invention.

As shown in FIGS. 6A and 6B, as is the case with the first embodiment, the circuits for performing the LPP detection processing include the photodetector, part of the matrix circuit 110, and the LPP detection circuit 0.

The structure of the photodetector is also the same as that of the first embodiment. The difference between them is that the push-pull signal is a signal having the voltage applied in a reverse direction as shown in FIG. 6A.

As shown in FIG. 5, the LPP detection circuit 0 includes a bottom hold circuit 1:10', LPF (Low Pass Filter) 20, a bottom hold circuit 2:30', the slice level generation circuit 40, the comparator 50, and a peak hold circuit 60'.

The push-pull signal output from the matrix circuit 110 is input into the bottom hold circuit 1:10', the LPF 20, and the comparator 50.

The bottom hold circuit 1:10' outputs a peak voltage B1 of the input voltage. As shown in the figure, the bottom hold circuit 1:10' includes a diode 10'a, a capacitor 10'b, and a resistor 10'c. The bottom hold circuit 1:10' is connected to the direct-current power supply unit 70 that is located outside.

Therefore, the falling edge of the voltage B1 output from the bottom hold circuit 1:10' is steep; in contrast, when the voltage increases, the rising edge thereof is gentle.

The voltage B1 which has been output from the bottom hold circuit 1:10' is input into the peak hold circuit 60'. As shown in the figure, the peak hold circuit 60' includes a diode 60'a, a capacitor 60'b, and a resistor 60'c.

The voltage which has been input into the peak hold circuit 60' is charged into the capacitor 60'b as an electric charge. Subsequently, electrical discharge through the resistor 60'c gradually occurs. Therefore, the voltage inputted into the peak hold circuit 60' gently decreases.

Therefore, the falling edge of a peak voltage p which is output from the peak hold circuit 60' is gentle. Subsequently, when the voltage increases, it changes in a relatively short period of time.

On the other hand, the LPF 20 attenuates the input signal. The attenuated signal is then input into the bottom hold circuit 2:30'. After that, a bottom voltage B2 is output from the bottom hold circuit 2:30'.

As is the case with the bottom hold circuit 1:10', the bottom hold circuit 2:30' includes a diode 30'a, a capacitor 30'b, and a resistor 30'c. The bottom hold circuit 2:30' is connected to the direct-current power supply unit 70 that is located outside. Characteristics of the bottom hold circuit 2:30' are the same as those of the bottom hold circuit 1:10'. In addition, characteristics of the voltage B2, which is output from the bottom hold circuit 2:30', are also the same as those of the voltage B1 output from the bottom hold circuit 1:10'. However, because the voltage is input into the bottom hold circuit 2:30' through the LPF 20, the voltage B2 output from the bottom hold circuit 2:30' becomes much higher.

Next, the peak voltage p output from the peak hold circuit 60' and the bottom voltage B2 output from the bottom hold circuit 2:30' are input into the slice level generation circuit 40. Then, the slice level generation circuit 40 divides the voltage difference between the peak voltage p and the bottom voltage B2 by a constant ratio to output a voltage, which is a slice level $V_{s1}$.

To be more specific, the slice level $V_{s1}$ is expressed by equation 3 as follows:

$$V_{s1}=r(p-B2) \quad \text{(Equation 3)}$$

This equation 3 is formed by replacing b of the equation 2 with p and by replacing P2 of the equation 2 with B2.

Incidentally, r is a proper division ratio used to detect LPP. For example, r is 1/2=50%.

Then, the comparator 50 compares the slice level $V_{s1}$, which has been generated by the slice level generation circuit 40, with the push-pull signal. If the push-pull signal is smaller than $V_{s1}$, it is to be judged that LPP has been detected. The above-described principles are the same as those used in the prior art.

During a period (A) shown in FIG. 6A, the push-pull signal, which is output at a position of LPP, is intermittently shown. In response to a push-pull signal which has become smaller than the slice level $V_{s1}$, LPP is detected as shown in FIG. 6B. This operation is the same as that of (A) shown in FIG. 8A illustrating the prior art.

If a noise n is caused by a defect of a land area, a problem arises. In this case, an extremely low spike-shaped bottom voltage B1 occurs. However, in this embodiment, the bottom voltage B1 is input into the peak hold circuit 60' so that it is converted into the peak voltage p. Then, the slice level $V_{s1}$ is generated on the basis of the equation 3.

In this embodiment, as shown in FIG. 6A, even if the occurrence of the noise n causes the bottom voltage B1 to become lower, the peak voltage p does not rapidly become lower. Rather it gradually decreases. Accordingly, the slice level $V_{s1}$ does not become so low. Therefore, even during the period (B) shown in FIG. 6A, it is possible to detect LPP as shown in FIG. 6B. After a lapse of a certain period of time, the bottom voltage B1 and the peak voltage p overlap each other at a point (D) shown in FIG. 6A. After that, the voltage slowly increases. In this embodiment, because the peak hold circuit 60' is provided to generate the slice level $V_{s1}$ from the peak voltage p, fluctuations in slice level $V_{s1}$ become small. Therefore, as shown in FIG. 6B, it is possible to detect LPP in all of the periods (A), (B), and (C) shown in FIG. 6A. More specifically, the period (A) is a period before the occurrence of the noise n; the period (B) is a period after the occurrence of the noise n; and the period (C) is a period during which the slice level $V_{s1}$ shifts to a steady state.

Effects of the Present Invention that can be Understood from the Embodiments

As understood from the above-described embodiments, according to the present invention, there is provided an optical disk drive for writing/reading data to/from an optical disk that is provided with LPP. To be more specific, it is possible to provide an optical disk drive whose noise immunity is high and whose LPP detection accuracy is high so that even if the optical disk drive uses a poor-quality disk on which LPP-like noises are caused by a defect of a land area, it is capable of successfully detecting LPP without fail.

What is claimed is:

1. An optical disk drive that uses an optical disk as a recording medium and that reads address information on the optical disk by use of a land prepit located in a land area of the optical disk, said optical disk drive comprising:
    a first peak hold circuit for inputting a push-pull signal that is generated from a reflected light beam from the optical disk;
    a second peak hold circuit for inputting the push-pull signal;
    a bottom hold circuit for inputting a first peak voltage output from the first peak hold circuit so as to output a bottom voltage;
    a slice level generation circuit for dividing the difference between the bottom voltage output from the bottom hold circuit and a second peak voltage output from the second peak hold circuit to generate a slice level used to detect a land prepit; and
    a comparator for comparing the push-pull signal with the slice level generated by the slice level generation circuit to detect the land prepit.

2. The optical disk drive according to claim 1, wherein:
    a voltage increase ratio of the bottom voltage output from the bottom hold circuit is lower than that of the first peak voltage.

3. The optical disk drive according to claim 1, wherein:
    the bottom voltage output from the bottom hold circuit is always lower than the first peak voltage.

4. An optical disk drive that uses an optical disk as a recording medium and that reads address information on the optical disk by use of a land prepit located in a land area of the optical disk, said optical disk drive comprising:
    a first bottom hold circuit for inputting a push-pull signal that is generated from a reflected light beam from the optical disk;
    a second bottom hold circuit for inputting the push-pull signal;
    a peak hold circuit for inputting a first bottom voltage output from the first bottom hold circuit so as to output a peak voltage;
    a slice level generation circuit for dividing the difference between the peak voltage output from the peak hold circuit and a second bottom voltage output from the second bottom hold circuit to generate a slice level used to detect a land prepit; and
    a comparator for comparing the push-pull signal with the slice level generated by the slice level generation circuit to detect the land prepit.

5. The optical disk drive according to claim 4, wherein:
    a voltage decrease ratio of the peak voltage output from the peak hold circuit is lower than that of the first bottom voltage.

6. The optical disk drive according to claim 4, wherein:
    the peak voltage output from the peak hold circuit is always higher than the first bottom voltage.

* * * * *